(12) United States Patent
Cho

(10) Patent No.: US 9,671,949 B2
(45) Date of Patent: Jun. 6, 2017

(54) METHOD AND APPARATUS FOR CONTROLLING USER INTERFACE BY USING OBJECTS AT A DISTANCE FROM A DEVICE WITHOUT TOUCHING

(71) Applicant: Samsung Electronics Co., Ltd., Gyeonggi-do (KR)

(72) Inventor: Chan-Ki Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 296 days.

(21) Appl. No.: 14/202,217

(22) Filed: Mar. 10, 2014

(65) Prior Publication Data

US 2014/0258932 A1   Sep. 11, 2014

(30) Foreign Application Priority Data

Mar. 8, 2013   (KR) .................. 10-2013-0024778

(51) Int. Cl.
*G06F 3/0482* (2013.01)
*G06F 3/0485* (2013.01)
*G06F 3/0488* (2013.01)

(52) U.S. Cl.
CPC .......... *G06F 3/0485* (2013.01); *G06F 3/0482* (2013.01); *G06F 3/04883* (2013.01); *G06F 2203/04101* (2013.01)

(58) Field of Classification Search
CPC ......... G06F 2203/04101; G06F 3/0485; G06F 3/0482; G06F 3/017; G06F 9/4443; H04N 5/44543
USPC ......................................... 715/810, 825, 863
See application file for complete search history.

(56) References Cited

U.S. PATENT DOCUMENTS

| | | | |
|---|---|---|---|
| 2008/0165141 A1 | 7/2008 | Christie | |
| 2010/0077343 A1 | 3/2010 | Uhl et al. | |
| 2011/0154263 A1* | 6/2011 | Roulliere | G06F 3/0482 715/830 |
| 2011/0164063 A1* | 7/2011 | Shimotani | G06F 3/0416 345/661 |
| 2012/0054670 A1* | 3/2012 | Rainisto | G06F 3/04883 715/784 |
| 2012/0235947 A1* | 9/2012 | Yano | G01C 21/3664 345/173 |
| 2013/0342491 A1* | 12/2013 | Liu | G06F 3/041 345/173 |
| 2014/0240215 A1* | 8/2014 | Tremblay | G06F 3/01 345/156 |

* cited by examiner

*Primary Examiner* — Rinna Yi
(74) *Attorney, Agent, or Firm* — Cha & Reiter, LLC

(57) ABSTRACT

Disclosed herein are a method and apparatus for controlling a user interface in an electronic device. Content details are displayed and scrolled at an initial scroll speed. An object is detected within a predetermined distance from an electronic device without touching the object. The initial scroll speed is reduced in accordance with the distance of the object.

8 Claims, 9 Drawing Sheets

METHOD AND APPARATUS FOR CONTROLLING USER INTERFACE BY USING OBJECTS AT A DISTANCE FROM A DEVICE WITHOUT TOUCHING

CLAIM OF PRIORITY

This application claims priority under 35 U.S.C. §119 to an application filed in the Korean Intellectual Property Office on Mar. 8, 2013 and assigned Serial No. 10-2013-0024778, the contents of which are incorporated herein by reference.

BACKGROUND

1. Technical Field

The present disclosure relates generally to methods and apparatuses for controlling a user interface (UI) in an electronic device.

2. Description of the Related Art

The advent of electronic devices (e.g., smart phones and portable terminals) using touchscreens has resulted in the rapid development of various input methods related to touch gestures. Meanwhile, the amount of information displayed on the screen has significantly increased as the performance of these devices has improved. When the amount of information is considerable, a user may scroll through the information to seek a particular item therein. For example, a user may look through an Internet page containing many pictures and text in a mobile browser by scrolling the Internet page vertically or horizontally, or search through thousands of contact addresses by scrolling a contact address list vertically. As such, the scroll function is a frequently-used user interface (UI) in Internet searches, document searches, or contact address searches.

The above-described scroll function is very commonly used to scan through a large amount of data on a screen with a limited space. In addition, a user may start scrolling by flicking the touchscreen with a finger and stop scrolling by touching the screen. However, since items may scroll very rapidly, it may difficult for the user to stop scrolling at a desired point in the data. That is, the user may inadvertently stop scrolling after or before the desired item is shown on the screen. Furthermore, when the user touches and selects a desired item in a real-time update list, such as an access point ("AP") list, an undesired item may be selected due to an instantaneous list update that causes the list to automatically shift. As such, there is a need for a method and apparatus that allows a user to effortlessly and accurately select a desired item in a scrolling or shifting list displayed on an electronic device.

SUMMARY

In view of the above, disclosed herein are an apparatus and method that substantially address the above problems and/or disadvantages. Accordingly, embodiments provide methods and apparatuses for controlling a user interface (UI) in an electronic device by using an object located within a predetermined distance from the device without touching the device.

Also, disclosed herein are methods and apparatus for accurately and easily selecting a desired item in a list displayed in an electronic device without error by controlling a scroll speed in accordance with the distance between the object and the device. Furthermore, examples herein provide methods and apparatus for accurately and easily selecting a desired item in a list that is updated in real time in accordance with the distance between an object and the electronic device in which the list is displayed.

According to another aspect of the present disclosure, a method for controlling a scroll speed in an electronic device may comprise: displaying content details; scrolling the content details at an initial scroll speed; detecting an object located within a predetermined distance from the electronic device without touching the object, while the content details scroll at the initial scroll speed; and reducing the initial scroll speed in accordance with a distance of the object from the electronic device, when the object is within the predetermined distance from the electronic device without touching.

In another example, reducing the initial scroll speed may include reducing the initial scroll speed continuously, while the object is detected within the predetermined distance from the electronic device without touching, and stopping the content details from scrolling, when the object is detected within the predetermined distance of the electronic device without touching for a predetermined time or greater. In one example, the predetermined time may be in accordance with the distance of the object from the electronic device such that the predetermined time increases as the distance increases and the predetermined time decreases as the distance decreases, while the distance of the object is detected to be within the predetermined distance without touching.

In a further example, the initial scroll speed may be reduced at a deceleration rate corresponding to the distance of the object from the electronic device, while the distance of the object is detected within the predetermined distance without touching, such that the deceleration rate decreases as the distance increases and the deceleration rate increases as the distance decreases. Reducing the initial scroll speed may further include reducing the initial scroll speed to a predetermined level while the object is detected within the predetermined distance without touching the object. In another aspect, the initial scroll speed may be restored, when the distance of the object from the electronic device is detected to be greater than or equal to the predetermined distance and the contents may be stopped from scrolling, when the object is detected to be directly touching the electronic device.

In accordance with yet another aspect of the present disclosure, a method for controlling an update list display in an electronic device may include: displaying a list of items that are updated in real time; detecting an object located within a predetermined distance from the electronic device without touching the object, while the list is displayed; and stopping display of the list when the object is detected within the predetermined distance from the electronic device without touching. The method may further include displaying an icon indicating a temporary stop of the display of the list, when the object is detected within the predetermined distance from the electronic device without touching the object. In yet a further example, the method may further include updating and displaying the list when the object is no longer detected to be within the predetermined distance.

According to another aspect of the present disclosure, an electronic device may include at least one memory and at least one program stored in the at least one memory which upon execution instructs the at least one processor to: display content details; scroll the content details at an initial scroll speed; detect an object located within a predetermined distance from the electronic device without touching the object, while the content details scroll at the initial scroll speed; and reduce the initial scroll speed in accordance with a distance of the object from the electronic device, when the object is within the predetermined distance from the electronic device without touching.

In a further example, to reduce the initial scroll speed the at least one program may further instruct at least one processor to reduce the initial scroll speed continuously, while the object is detected within the predetermined distance from the electronic device without touching, and stop the content details from scrolling, when the object is detected within the predetermined distance of the electronic device without touching for a predetermined time or greater.

In yet a further example, the at least one program may further instruct at least one processor to identify the predetermined time in accordance with the distance of the object from the electronic device such that the predetermined time increases as the distance increases and the predetermined time decreases as the distance decreases, while the distance of the object is detected to be within the predetermined distance without touching.

In another aspect, the at least one program may further instruct at least one processor to reduce the initial scroll speed at a deceleration rate corresponding to the distance of the object from the electronic device, while the distance of the object is detected within the predetermined distance without touching, such that the deceleration rate decreases as the distance increases and the deceleration rate increases as the distance decreases.

In yet a further aspect, the at least one program may further instruct at least one processor to reduce the initial scroll speed to a predetermined level while the object is detected within the predetermined distance without touching the object, and restore the initial scroll speed, when the distance of the object from the electronic device is detected to be greater than or equal to the predetermined distance. In another example, the at least one program further instructs at least one processor to stop the content details from scrolling, when the object is detected to be directly touching the electronic device.

According to another aspect of the present disclosure, an electronic device may include at least one memory and at least one program stored in the at least one memory which upon execution may instruct at least one processor to: display a list of items that are updated in real time; detect an object located within a predetermined distance from the electronic device without touching the object, while the list is displayed; and stop display of the list when the object is detected within the predetermined distance from the electronic device without touching.

In a further example, the at least one program may further instruct at least one processor to display an icon indicating a temporary stop of the display of the list, when the object is detected within the predetermined distance from the electronic device without touching the object. In yet another example, the at least one program may further instruct at least one processor to update and display the list when the object is no longer detected to be within the predetermined distance.

BRIEF DESCRIPTION OF THE DRAWINGS

The above features and advantages of the present disclosure will become more apparent from the following detailed description when taken in conjunction with the accompanying drawings in which.

DETAILED DESCRIPTION

Examples of the present disclosure will be described herein with reference to the accompanying drawings. In the following description, detailed descriptions of well-known functions or configurations will be omitted since they would unnecessarily obscure the subject matter of the present disclosure. Also, the terms used herein are defined in accordance with the functions of the present disclosure. Thus, the terms may vary depending on users' or operators' intentions or practices. Therefore, the terms used herein should be understood based on the descriptions made.

Examples of the present disclosure relate methods and apparatus for controlling a user interface (UI) in an electronic device. In particular, the examples of the present disclosure relate to methods and apparatus for accurately selecting a desired item in a list in an electronic device without error by controlling a scroll speed or a real-time update list display based on the distance of an object from the electronic device.

Figure 1C:
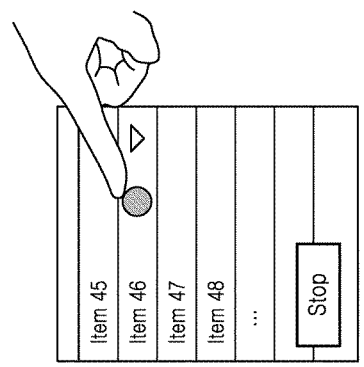
FIG. 1A, FIG. 1B and FIG. 1C are diagrams illustrating a working example for controlling a scroll speed in accordance with aspects of the present disclosure.
Figure 1B:
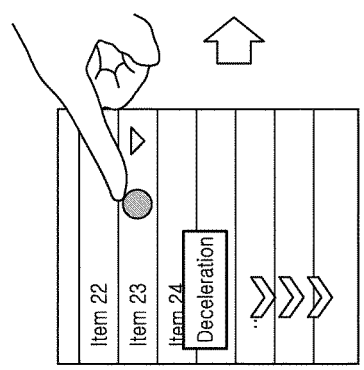
Figure 1A:
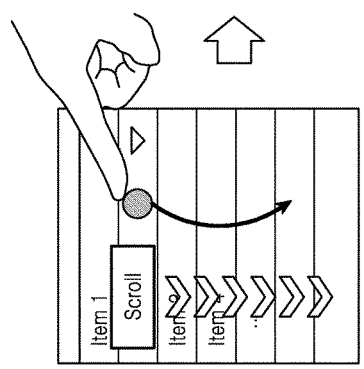

FIG. 1 is a diagram illustrating a working example for controlling a scroll speed in accordance with aspects of the present disclosure. In the working example shown in FIG. 1, the object is a finger, but it is understood that the object could include any other object, such as a stylus or a touch pen. FIG. 1A illustrates a scroll start according to a gesture such as a flicking operation. The flicking operation may refer to an input state in which a user lightly slides a finger or the like across a surface of the touchscreen in a particular direction. However, in the example, the scroll initiation is not limited to the flicking operation, and the scroll may be initiated with various user gestures. Also, when the scrolling is initiated with a gesture (e.g., a flicking operation) a plurality of items in a list may scroll upward at a high speed.

FIG. 1B illustrates reducing a speed of items scrolling at a high speed in order to locate a desired item in a list after the scroll is initiated. In this example, the object or the finger may hover at a distance from the screen without the finger touching the screen. When the finger is detected to be within a predetermined distance of the screen, a speed (hereinafter referred to as a scroll speed) of the items in the list may be reduced. When the finger is removed, such that the distance between the finger and the device is greater than or equal to the predetermined distance, the scroll speed may maintain the reduced speed or return to a previous scroll speed.

FIG. 1C illustrates touching a desired item in the list. While reducing the scroll speed of items in the list by hovering the finger within a predetermined distance from the screen, the user may stop the scroll operation by touching a desired item when the desired item is located.

By way of example, when an item "Thomas" located in the midst of 1,000 contact addresses is searched, a flicking operation may be used to scroll items in the list at a very high speed. Thereafter, when a name starting with "S" appears, the user may expect that a name starting with "T" will appear, and the user may slightly reduce a scroll speed by hovering a finger within a predetermined distance from the device for about 1 to 2 seconds. Thereafter, when a name starting with "T" appears, the user may further reduce a scroll speed by hovering the finger for about 2 to 3 seconds within a predetermined distance of the device. In another example, the scroll speed may be controlled in accordance with a distance between the finger and the device instead of the hovering duration time. Thereafter, when the item "Thomas" appears, the user may stop scrolling by touching the item "Thomas."

Figure 2:
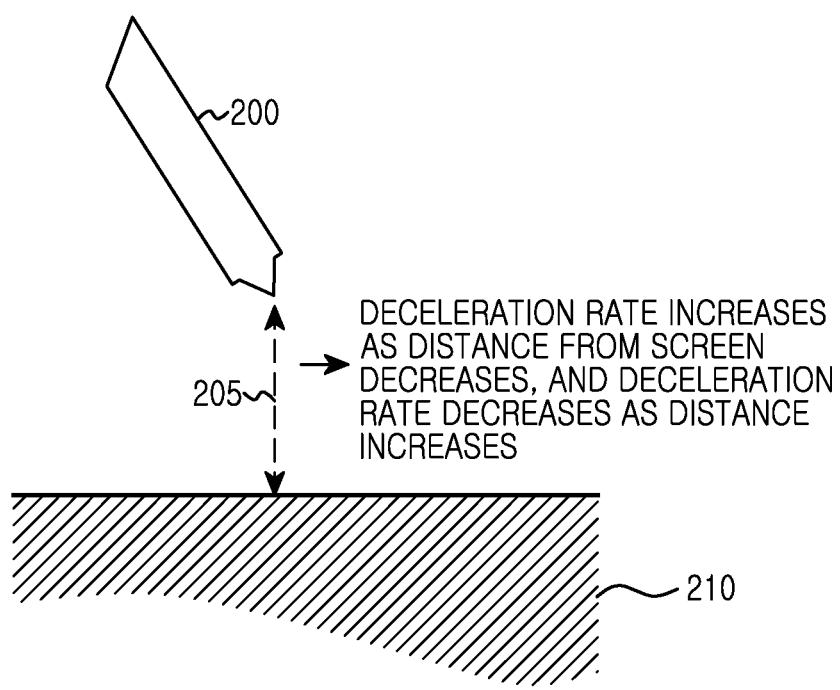
FIG. 2 is a diagram illustrating an example relation between a distance of an object from the device and a scroll speed in accordance with aspects of the present disclosure.

FIG. 2 is a diagram illustrating an example relation between the distance of an object from a screen and a scroll speed in accordance with aspects of the present disclosure. In FIG. 2, a hovering object may refer to a pointing object 200, such as a finger or a touch pen, when the pointing object 200 approaches a sensing surface of a touchscreen 21 (i.e., before the pointing object 200 directly touches the sensing surface of the touchscreen 210).

In another example, a deceleration rate of the scroll speed may be controlled according to the distance 205 from the sensing surface of the touchscreen 210 to the pointing object 200. For example, the deceleration rate may increase as the distance 205 decreases, and the deceleration rate may decrease as the distance 205 increases. That is, the deceleration rate may increase as the pointing object 200 approaches the sensing surface of the touchscreen 210, and the deceleration rate may decrease as the pointing object 200 recedes from the sensing surface of the touchscreen 210. If the hovering object is removed, the pointing object 200 may not be sensed because the distance between the sensing surface of touchscreen 210 and pointing object 200 may be greater than or equal to a predetermined distance.

Figure 3:
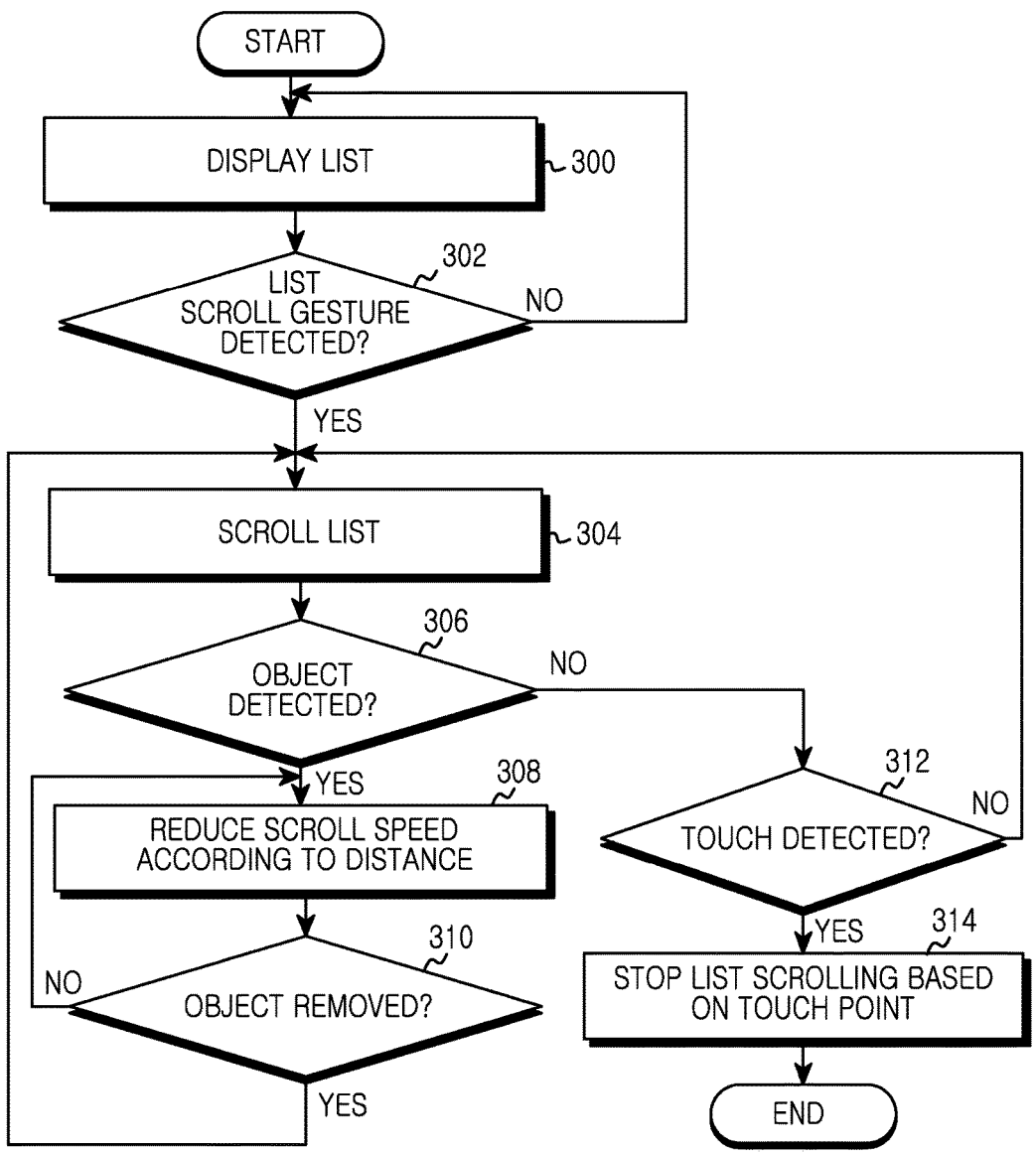
FIG. 3 is a flow diagram of an example method for controlling a scroll speed in accordance with aspects of the present disclosure.

FIG. 3 is a flow diagram illustrating an example method for controlling a scroll speed in accordance with aspects of the present disclosure. In FIG. 3 block 300, an electronic device displays items in a list. In block 302, the electronic device determines whether a list scroll gesture (e.g., a flicking operation) is detected. When a list scroll gesture is detected, the electronic device may proceed to block 304 and scroll the items in the list at an initial speed. In block 306, the electronic device detects whether an object is within a predetermined distance from the electronic device, during the scroll operation, without touching the object. When the object is detected during the scroll operation, the electronic device may proceed to block 308 and reduce a scroll speed in accordance with the distance between the object and the electronic device.

When a hovering object is detected in a scroll operation state, a scroll speed control may perform one of the following three example operations.

In a first example, the scroll speed may be reduced continuously while the object is detected within a predetermined distance from the device. For example, the scroll speed may be reduced continuously while the hovering object remains within the predetermined distance, and the scroll operation may stop without direct contact with the device, when the hovering object is detected within the predetermined distance for a predetermined time or greater.

In a second example, the scroll speed may be reduced at a predetermined rate. For example, when a scroll deceleration rate corresponding to a particular distance between the object and the device may be 50%, a scroll speed of 100 m/s may be reduced to 50 m/s and a scroll speed of 20 m/s may be reduced to 10 m/s. Therefore, unlike the first example, since the deceleration is not a continuous deceleration but one-time deceleration, the scroll is not completely stopped by maintaining the object within the predetermined distance for a long time.

In a third example, the scroll speed may be reduced to a predetermined level. For example, the scroll speed may be reduced to a predetermined level regardless of an initial scroll speed. That is, when an object is detected within a predetermined distance from the device, the scroll speed may be reduced to 20 m/s regardless of whether the scroll speed is 100 m/s or 50 m/s. However, when the scroll speed is lower than the predetermined level, the scroll speed may not be reduced. As in the second example, the scroll may not completely stop by maintaining the object within the predetermined distance for a long time.

In block 310, the electronic device may determine whether the object is removed, that is, whether the pointing object 200 recedes from the sensing surface of the touchscreen 210 such that the distance between the sensing surface of touchscreen 210 and pointing object 200 is greater than or equal to the predetermined distance. When the object is removed, the electronic device may return to block 304 and continuously scroll at the initial scroll speed or the previous scroll speed.

On the other hand, when an object is not detected during a scroll operation (in block 306), the electronic device may proceed to block 312 and determine whether a touch input is detected. When a touch input is detected, the electronic device may proceed to block 314 and stop scrolling based on a touch point. When a touch input is not detected, the electronic device may return to block 304 and maintain the current scroll operation.

Figure 4:
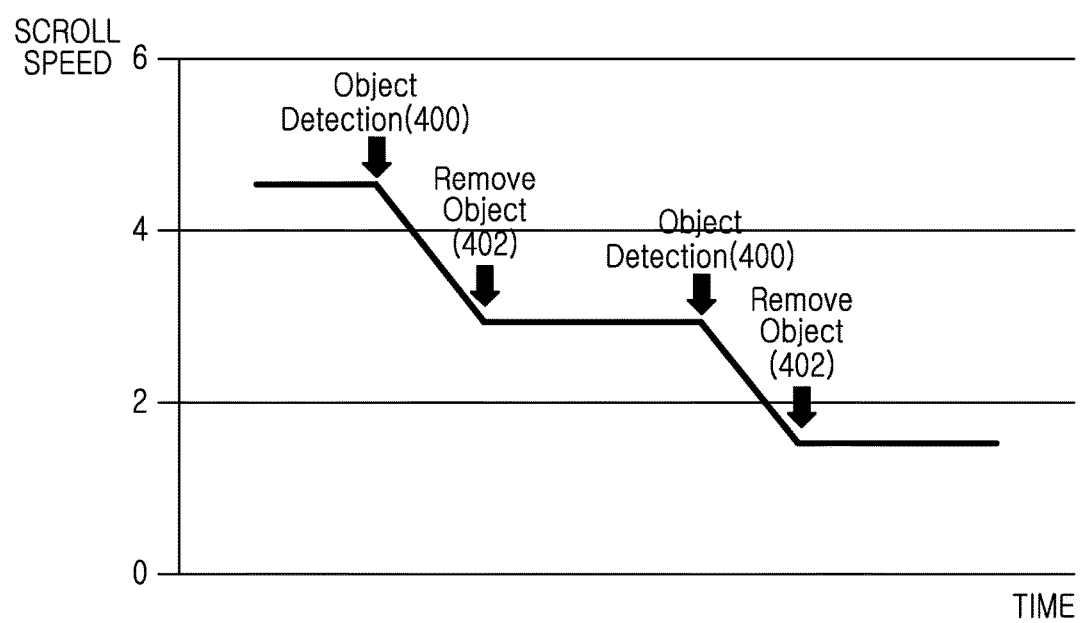
FIG. 4 is a graph illustrating an example relation between a distance of an object from a device and a scroll speed in accordance with aspects of the present disclosure.

FIG. 4 is a graph illustrating an example relation between a distance of an object from a device and a scroll speed. In FIG. 4, the scroll speed may be reduced at a predetermined rate or to a predetermined level at each object detection 400, and the scroll speed reduced by the object detection 400 may be maintained. For example, if the initial scroll speed is 4.5, when the object is first detected within a predetermined distance from the device, the scroll speed may be reduced while the object is detected; the scroll speed may become 3 when an object removal 402 is detected; and, the scroll speed may be maintained at 3 before an object is detected a second time. Thereafter, when the object is detected a second time, the scroll speed may be reduced during the second detection and the scroll speed may become 1.7 when the object removal 502 is detected.

Figure 5:
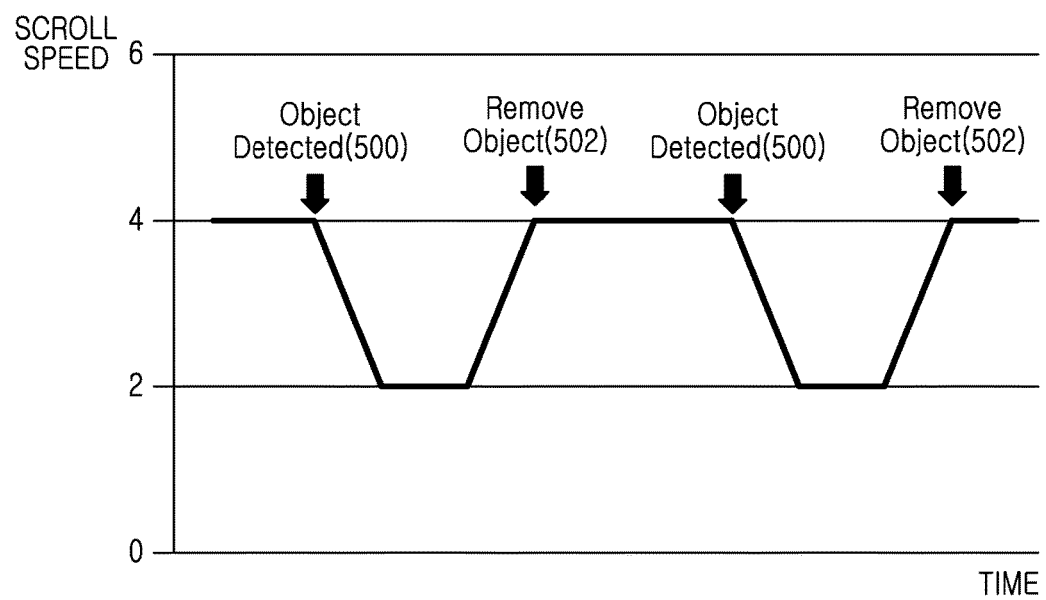
FIG. 5 is a graph illustrating an example relation between a distance of an object and a scroll speed in accordance with aspects of the present disclosure.

FIG. 5 is a graph illustrating another example relation between an object's distance from the device and a scroll speed. In FIG. 5, the scroll speed may be reduced at a predetermined rate or to a predetermined level at each object detection 500, and it may be restored to the previous scroll speed or the initial scroll speed each time an object removal 502 is detected. For example, if the initial scroll speed is 4, when the object is detected within a predetermined distance of the device a first time, the scroll speed may become 2 by being reduced at a predetermined rate or to a predetermined level while the object is detected. The scroll speed may be restored to 4 when the object is removed. Likewise, when an object is detected a second time, the scroll speed may become 2 by being reduced at a predetermined rate or to a predetermined level while the object is detected, and the scroll speed may be restored to 4 when the object is removed.

Figure 6B:
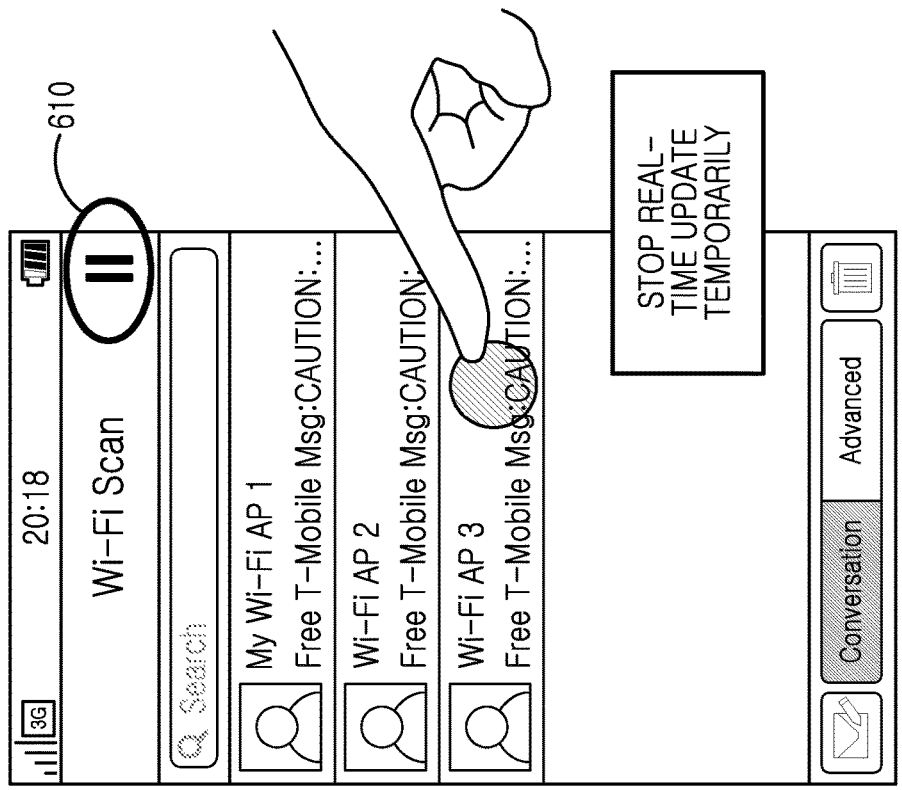
FIG. 6A and FIG. 6B are diagrams illustrating a working example for controlling a real-time update list display in accordance with aspects of the present disclosure.
Figure 6A:
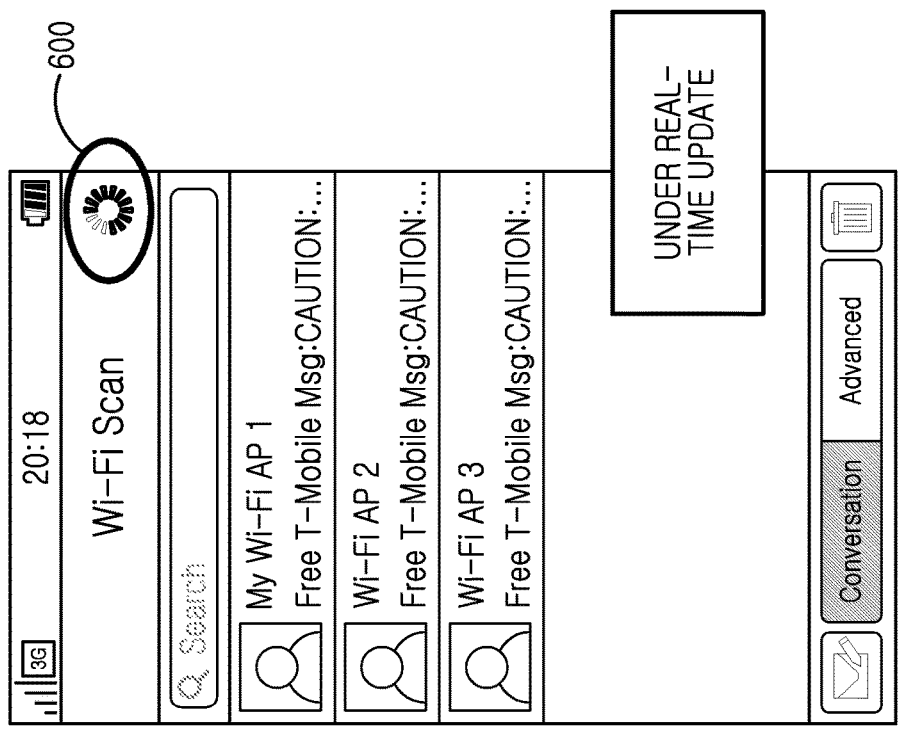

FIG. 6 is a diagram illustrating a working example for controlling a real-time update list display. FIG. 6A illustrates an example in which the result of a real-time update list, such as an AP update list, is displayed. A mark 600 indicates that an AP list is being updated in real time. Referring now to FIG. 6B, a real-time AP update list display may be temporarily stopped when an object is detected within a predetermined distance from the device during a real-time AP list update. That is, an AP list update may not be stopped, but an AP list may be updated in real time and a display of an updated AP may be stopped. In other example, the AP list update may be stopped. A temporary mark icon 610 may indicate that an AP update list display is temporarily stopped.

By way of example, when the user executes a setting menu for a Wi-Fi connection, AP scanning is started and a list update is performed at predetermined intervals (e.g., 3 to 4 seconds) as illustrated in FIG. 6A. When a desired AP is detected, the user may select a desired item by hovering a finger over and then touching the desired item. Since the AP update list display is temporarily stopped while the finger is hovering, inadvertent selection of an undesired item may be avoided. In addition, while the finger is hovering, a temporary stop icon 610 may be displayed to indicate that the update list display is temporarily stopped. However, the list may be continuously updated and stored while the update list display is temporarily stopped by the hovering finger, and the updated list may be displayed when the hovering finger is removed.

Figure 7:
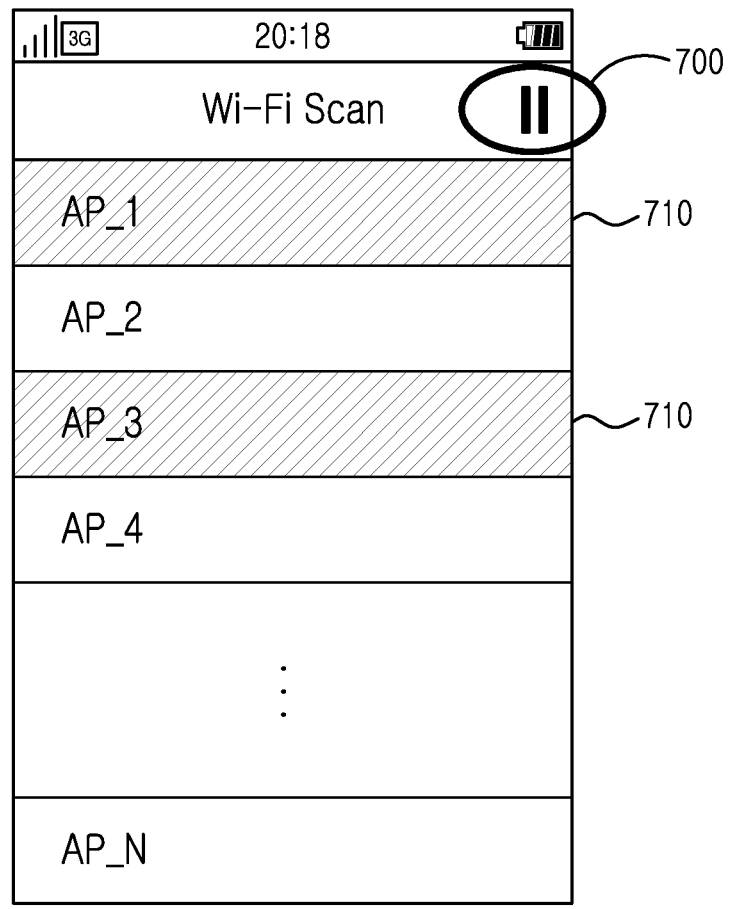
FIG. 7 is a diagram illustrating an example screen for processing an unavailable item during a real-time list update in accordance with aspects of the present disclosure.

FIG. 7 is a diagram illustrating an example screen for processing an unavailable item during a real-time list update. Referring to FIG. 7, there may be instances where some items in a list are unavailable, while an update list display is temporarily stopped by a hovering object. In this instance, even when an update list display is temporarily stopped by a hovering object, an unavailable item in the currently-displayed list may be dimmed. That is, a highlight mark such as a headlight may be applied to the unavailable item. For example, in a state 700 where an update list display is temporarily stopped by a hovering object, unavailable items AP_1 (710) and AP_3 (710) in the list may be darkened in comparison with other items.

Figure 8:
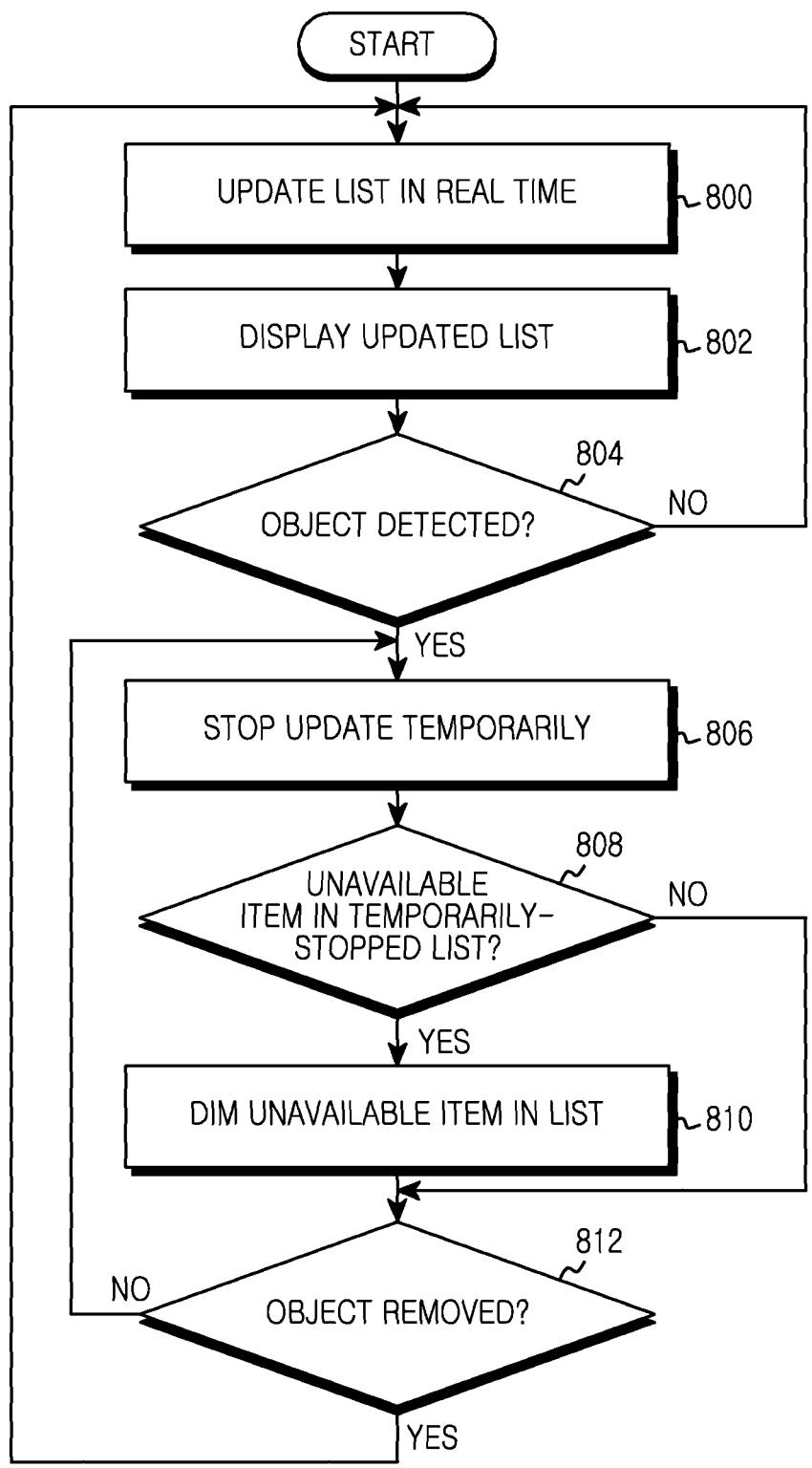
FIG. 8 is a flow diagram illustrating an example method for controlling a real-time update list display in accordance with aspects of the present disclosure.

FIG. 8 is a flow diagram illustrating a method for controlling a real-time update list display by using an object located within a predetermined distance from the device without touching the device. In FIG. 8, at block 800, an electronic device may display a list in real time. In block 802, the electronic device may display an updated list. In block 804, the electronic device may detect whether an object is within a predetermined distance from the electronic device without touching the object. When the object is detected, the electronic device may proceed to block 806, and when an object is not detected, the electronic device may return to block 800.

In block 806, the electronic device may temporarily stop a list update. That is, the electronic device may temporarily stop an update list display when the object is detected. Also, when the object is detected, a temporary stop icon may be displayed to indicate that the update list display is temporarily stopped. However, the list may be continuously updated and stored while the update list display is temporarily stopped due to detection of the object, and the updated list may be displayed when the object is removed.

In block 808, the electronic device may determine whether there is an unavailable item in the temporarily-stopped list. When there is an unavailable item in the temporarily-stopped list, the electronic device may proceed to block 810, and when there is no unavailable item in the temporarily-stopped list, the electronic device may proceed to block 812. In block 810, the electronic device may dim the unavailable item in the list. That is, a highlight mark such as a headlight may be applied to the unavailable item. In block 812, the electronic device may determine whether the object is removed. When the object is removed, the electronic device may return to block 800, and when the object is not removed, the electronic device may return to block 806.

Figure 9:
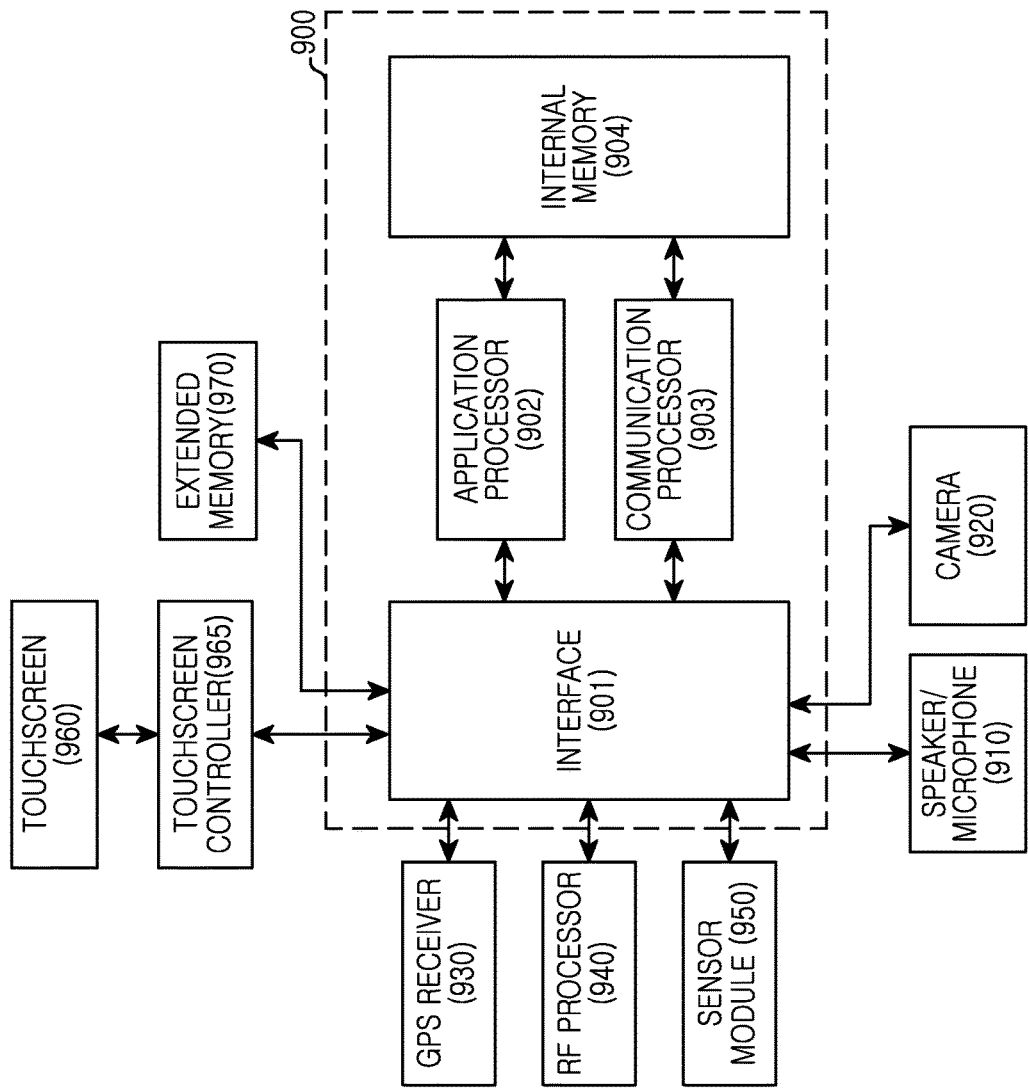
FIG. 9 is a block diagram of an example electronic device in accordance with aspects of the present disclosure.

FIG. 9 is a block diagram of an example electronic device in accordance with aspects of the present disclosure. The electronic device may be a portable electronic device, examples of which may include portable terminals, mobile terminals, mobile pads, media players, tablet computers, handheld computers, and personal digital assistants (PDAs). Also, the electronic device may be any portable electronic device including a combination of two or more functions of the above devices. In FIG. 9, the electronic device may include a controller 900, a speaker/microphone 910, a camera 920, a Global Positioning System (GPS) receiver 930, a Radio Frequency (RF) processor 940, a sensor module 950, a touchscreen 960, a touchscreen controller 965, and an extended memory 970.

The controller 900 may include an interface 901, one or more processors 902 and 903, and an internal memory 904. In some cases, the controller 900 may also be referred to as a processor. The interface 901, the application processor 902, the communication processor 903, and the internal memory 904 may be separate units, or may be integrated on one or more integrated circuits.

The application processor 902 may execute various software programs to perform various functions for the electronic device, and the communication processor 903 may perform processes and controls for voice communication and data communication. In addition to these general functions, the processors 902 and 903 may execute a software module (instruction set) stored in the extended memory 970 or the internal memory 904 and perform various functions corresponding to the software module. That is, the processors 902 and 903 may be instructed to perform a method of controlling a scroll speed or a real-time update list display based on an object within a predetermined distance from the device in cooperation with the software modules stored in the extended memory 970 or the internal memory 904.

For example, the application processor 902 may display items in a list; determine whether a list scroll gesture (e.g., a flicking operation) is detected; scroll the content details at an initial scroll speed; detect an object located within a predetermined distance from the electronic device without touching the object, while the content details scroll at the initial scroll speed; and reduce the initial scroll speed in accordance with a distance of the object from the electronic device, when the object is within the predetermined distance from the electronic device without touching. When an object is detected in a scroll operation state, a scroll speed control based on the distance between the object and the device may perform one of the following three operations:

In a first example, the scroll speed may be reduced continuously while the object is detected within a predetermined distance from the device. For example, the scroll speed may be reduced continuously while the hovering object remains within the predetermined distance, and the scroll operation may stop without direct contact with the device, when the hovering object is detected within the predetermined distance for a predetermined time or greater.

In a second example, the scroll speed may be reduced at a predetermined rate. For example, when a scroll deceleration rate corresponding to a particular distance between the object and the device may be 50%, a scroll speed of 100 m/s may be reduced to 50 m/s and a scroll speed of 20 m/s may be reduced to 10 m/s. Therefore, unlike the first example, since the deceleration is not a continuous deceleration but one-time deceleration, the scroll is not completely stopped by maintaining the object within the predetermined distance for a long time.

In a third example, the scroll speed may be reduced to a predetermined level. For example, the scroll speed may be reduced to a predetermined level regardless of an initial scroll speed. That is, when an object is detected within a predetermined distance from the device, the scroll speed may be reduced to 20 m/s regardless of whether the scroll speed is 100 m/s or 50 m/s. However, when the scroll speed is lower than the predetermined level, the scroll speed may not be reduced. As in the second example, the scroll may not completely stop by maintaining the object within the predetermined distance for a long time.

When the object is removed, the application processor 902 may continuously perform the scroll at the initial scroll speed or the previous scroll speed. When an object is not detected, the application processor 902 may determine whether a touch input is detected. When a touch input is detected, the application processor 902 may stop the scroll based on a touch point. When a touch input is not detected, the application processor 902 may maintain the current scroll operation.

Also, the application processor 902 controlling a real-time update list display may display a list of items that are updated in real time; detect an object located within a predetermined distance from the electronic device without touching the object, while the list is displayed; and stop display of the list when the object is detected within the predetermined distance from the electronic device without touching. That is, when an object is detected, the application processor 902 may temporarily stop the update list display and display a temporary stop icon to indicate that the update list display is temporarily stopped. The application processor 902 may determine whether there is an unavailable item in the temporarily-stopped list. When there is an unavailable item in the temporarily-stopped list, the application processor 902 may dim the unavailable item in the list. That is, a highlight mark such as a headlight may be applied to the unavailable item. When the object is removed, the application processor 902 may display the updated list, and when the object is not removed, the application processor 902 may maintain the temporary stop of the list update.

Other processors (not illustrated) may include at least one data processor, image processor, or codec. The data processor, the image processor, or the codec may be configured separately. Also, the processor may be configured by a plurality of processors performing different functions. The interface 901 is connected to the touchscreen controller 965 and the extended memory 970 of the electronic device.

The sensor module 950 may be connected to the interface 901 to perform various functions. For example, a motion sensor and an optical sensor may be connected to the interface 901 to detect a motion of the electronic device and detect light from the outside. In addition, other sensors such as a position measuring system, a temperature sensor, and a biosensor may be connected to the interface 901 to perform relevant functions.

The camera 920 may be connected through the interface 901 to the sensor module 950 to perform camera functions such as photographing and video clip recording.

The RF processor 940 performs communication functions. For example, under the control of the communication processor 903, the RF processor 940 converts an RF signal into a baseband signal and provides the same to the communication processor 903, or converts a baseband signal from the communication processor 903 into an RF signal prior to transmission. Herein, the communication processor 903 processes baseband signals according to various communication schemes. For example, the communication schemes may include, but not limited to, a GSM (Global System for Mobile Communication) communication scheme, an EDGE (Enhanced Data GSM Environment) communication scheme, a CDMA (Code Division Multiple Access) communication scheme, a W-CDMA (W-Code Division Multiple Access) communication scheme, an LTE (Long Term Evolution) communication scheme, an OFDMA (Orthogonal Frequency Division Multiple Access) communication scheme, a WiFi (Wireless Fidelity) communication scheme, a WiMax communication scheme, and/or a Bluetooth communication scheme.

The speaker/microphone 910 may perform audio stream input/output such as voice recognition, voice replication, digital recording, and phone functions. That is, the speaker/microphone 910 converts a voice signal into an electrical signal or coverts an electrical signal into a voice signal. Although not illustrated, an attachable/detachable earphone, a headphone, or a headset may be connected through an external port to the electronic device.

The touchscreen controller 965 may be connected to the touchscreen 960. For example, the touchscreen 960 and the touchscreen controller 965 may detect a touch, a motion, or a stop thereof by using multi-touch detection technologies including a proximity sensor array or other elements, as well as capacitive, resistive, infrared and surface acoustic wave technologies for determining one or more touch points with the touchscreen 960. The touchscreen 960 provides an input/output interface between the electronic device and the user. That is, the touchscreen 960 transmits a user touch input to the electronic device. Also, the touchscreen 960 is a medium that displays the output from the electronic device to the user. That is, the touchscreen 960 displays a visual output to the user. The visual output may be represented by a text, a graphic, a video, or a combination thereof. The touchscreen 960 may use various display technologies. For example, the touchscreen 960 may use an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED(Flexible LED).

The GPS receiver 930 converts signals received from satellites into information such as position, speed and time. For example, the distance between a satellite and the GPS receiver is calculated by multiplying the velocity of light by a signal arrival time, and the position of the electronic device is measured by triangulation by obtaining the accurate positions and distances of three satellites.

The extended memory 970 or the internal memory 904 may include one or more high-speed random-access memories (RAMs) such as magnetic disk storage devices, one more nonvolatile memories, one or more optical storage devices, and/or one or more flash memories (for example, NAND flash memories or NOR flash memories). The extended memory 970 or the internal memory 904 stores software. Elements of the software include an operation system (OS) software module, a communication software module, a graphic software module, a user interface (UI) software module, an MPEG module, a camera software module, and one or more application software modules. Since the module that is an element of the software may be represented as a set of instructions, the module may be referred to as an instruction set. The module may also be referred to as a program.

The OS software includes various software elements for controlling general system operations. For example, control of the general system operation includes memory control/management, storage hardware (device) control/management, and power control/management. The OS software also performs a function for enabling smooth communication between various hardware elements (devices) and software elements (modules).

The communication software module may enable communication with other electronic devices (such as computers, servers, and/or portable terminals) through the RF processor 940. The communication software module includes a protocol structure corresponding to a relevant communication scheme.

The graphic software module includes various software elements for providing and displaying graphics on the touchscreen 960. The graphics include texts, web pages, icons, digital images, videos, and animations.

The UI software module includes various software elements related to a user interface. The UI module includes information about how the state of a user interface changes or information about under what condition the state of a user interface changes.

The camera software module includes camera-related software elements that enable camera-related processes and functions. The application module includes a browser application including a rendering engine, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, and the like. The memories 970 and 904 may further include an additional module (instructions) in addition to the above-described modules. Also, in some cases, some of the modules (instructions) may not be used. According to aspects of the present disclosure, the memories 970 and 904 further include instructions for controlling a scroll speed or a real-time update list display by detecting an object at a distance of the electronic device without the object touching the device (see FIGS. 3 and 8).

In accordance with aspects of the present disclosure, the application module may include instructions for controlling a scroll speed or a real-time update list display by detecting an object within a predetermined distance of the electronic device (see FIGS. 3 and 8) without touching the object. For example, the application module may display items in a list, determine whether a list scroll gesture (e.g., a flicking operation) is detected, scroll the items in the list at an initial speed when a list scroll gesture is detected, detect an object located within a predetermined distance from the electronic device without touching the object, while the content details scroll at the initial scroll speed, and reduce the initial scroll speed in accordance with a distance of the object from the electronic device, when the object is within the predetermined distance from the electronic device without touching.

When the object is removed, the application module continues scrolling at the initial scroll speed or the previous scroll speed. When an object is not detected during the scroll operation, the application module may determine whether a touch input is detected. When a touch input is detected, the application module may stop the scroll based on a touch point. When a touch input is not detected, the application module may maintain the current scroll operation.

Also, the application module may control a real-time update list display. In one example, the application module may display an updated list, determine whether an object is located within a predetermined distance from the electronic device without touching the object, while the list is displayed, continue displaying the updated list when the object is not detected, and may temporarily stop the list update when the object is detected. That is, when an object is detected, the application module may temporarily stop the update list display and display a temporary stop icon to indicate that the update list display is temporarily stopped. The application module may determine whether there is an unavailable item in the temporarily-stopped list. When there is an unavailable item in the temporarily-stopped list, the application module may dim the unavailable item in the list. That is, a highlight mark such as a headlight may be applied to the unavailable item.

The methods disclosed herein may be implemented by hardware, software, or a combination thereof. When the methods are implemented by software, a non-transitory computer-readable medium may be provided to store one or more programs (software modules). The one or more programs stored in the non-transitory computer-readable medium may be configured for execution by one or more processors in an electronic device. The one or more programs may include instructions for causing the electronic device to execute the methods according to the examples described in the claims and/or specification of the present disclosure.

These programs (software modules or software) may be stored in random access memories (RAMs), nonvolatile memories including flash memories, read only memories (ROMs), electrically erasable programmable ROMs (EEPROMs), magnetic disc storage devices, compact discROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

Also, the programs may be stored in an attachable storage device that may be accessed by the electronic device through a communication network such as Internet, Intranet, local area network (LAN), wireless LAN (WLAN), or storage area network (SAN), or through a communication network configured by a combination thereof. This storage device may be accessed by the electronic device through an external port. Also, a separate storage device on a communication network may be accessed by a portable electronic device.

Although the method of controlling a scroll speed as illustrated in FIG. 3 and the method of controlling a real-time update list display as illustrated in FIG. 8 have been separately described, the scroll speed control method and the real-time update list display control method may be simultaneously performed in combination.

As described above, since the scroll speed is controlled by detecting an object within a predetermined distance from the device, it is possible to locate a desired position more quickly with fewer inputs. Also, since the real-time update list display may be controlled using the object within a predetermined distance from the device, it is possible to minimize inadvertent selection of an undesired item from the real-time update list due to an update of the list at an inconvenient time.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The functions and process steps herein may be performed automatically or wholly or partially in response to user command. An activity (including a step) performed automatically is performed in response to executable instruction or device operation without user direct initiation of the activity. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

While the invention has been shown and described with reference to certain examples, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

What is claimed is:

1. A method in an electronic device, comprising:
   displaying content;
   scrolling the content at an initial scroll speed;
   detecting an object located within a predetermined distance from the electronic device without touching the object, while the content scroll at the initial scroll speed when the object is within the predetermined distance from the electronic device without touching;
   reducing the initial scroll speed continuously based on the object being detected as remaining within the predetermined distance from the electronic device without touching; and
   stopping the content being scrolled after a predetermined time or greater, when the object is detected as remaining within the predetermined distance of the electronic device without touching.

2. The method of claim 1, further comprising identifying the predetermined time in accordance with the distance of the object from the electronic device such that the predetermined time increases as the distance increases and the predetermined time decreases as the distance decreases, while the distance of the object is detected to be within the predetermined distance without touching.

3. The method of claim 1, further comprising
   restoring the initial scroll speed, when the distance of the object from the electronic device is detected to be greater than or equal to the predetermined distance.

4. The method of claim 1, further comprising
   stopping the content being scrolled, when the object is detected to be directly touching the electronic device.

5. An electronic device comprising:
   at least one memory; and
   at least one program stored in the at least one memory which upon execution instructs the at least one processor to:
   display content;
   scroll the content an initial scroll speed;
   when an object is within a predetermined distance from the electronic device without touching, detect the object located within the predetermined distance from the electronic device without touching the object, while the content scroll at the initial scroll speed; and
   reduce the initial scroll speed continuously based on the object being detected as remaining within the predetermined distance from the electronic device without touching; and
   stop the content being scrolled after a predetermined time or greater, when the object is detected as remaining within the predetermined distance of the electronic device without touching.

6. The electronic device of claim 5, wherein the at least one program further instructs at least one processor to identify the predetermined time in accordance with the distance of the object from the electronic device such that the predetermined time increases as the distance increases and the predetermined time decreases as the distance decreases, while the distance of the object is detected to be within the predetermined distance without touching.

7. The electronic device of claim 5, wherein the at least one program further instructs at least one processor to restore the initial scroll speed, when the distance of the object from the electronic device is detected to be greater than or equal to the predetermined distance.

8. The electronic device of claim 5, wherein the at least one program further instructs at least one processor to stop the content being scrolled, when the object is detected to be directly touching the electronic device.

* * * * *